Feb. 11, 1930.　　　F. M. HARRISON　　　1,746,588
METHOD AND OUTFIT FOR FEATHER WEAVING
Filed March 11, 1929　　2 Sheets-Sheet 2
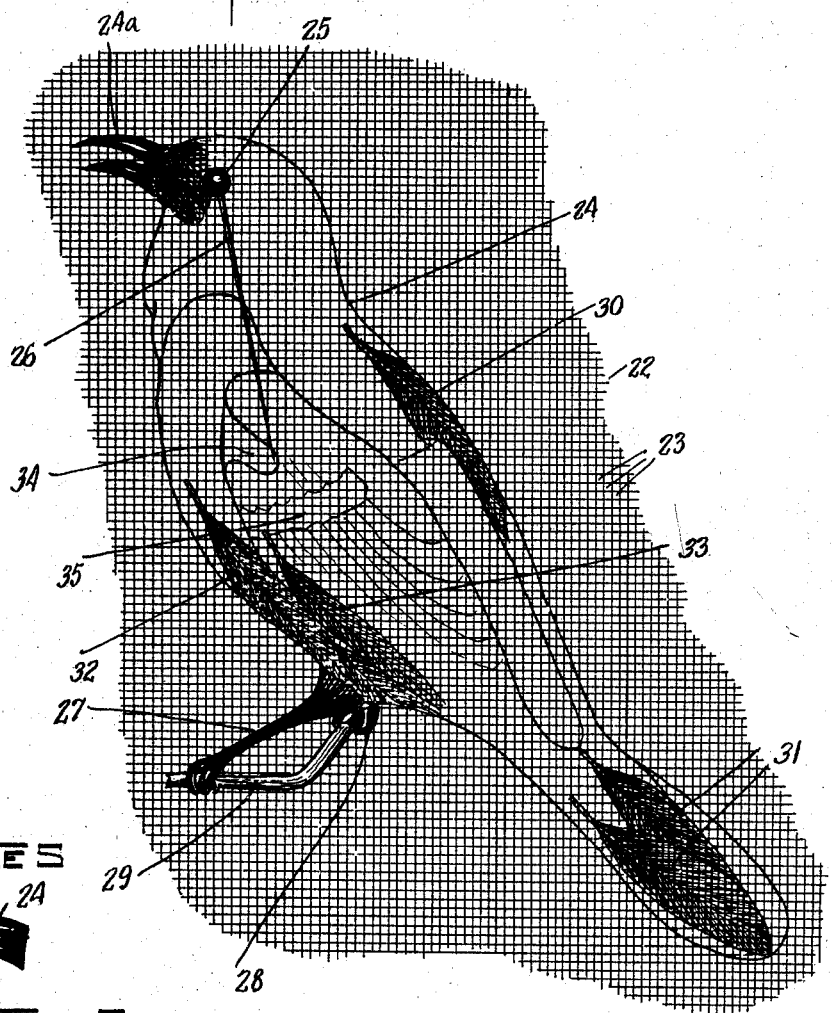
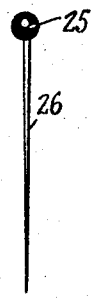
INVENTOR
FREDRICK M. HARRISON
BY Walton Harrison
ATTORNEY Patented Feb. 11, 1930

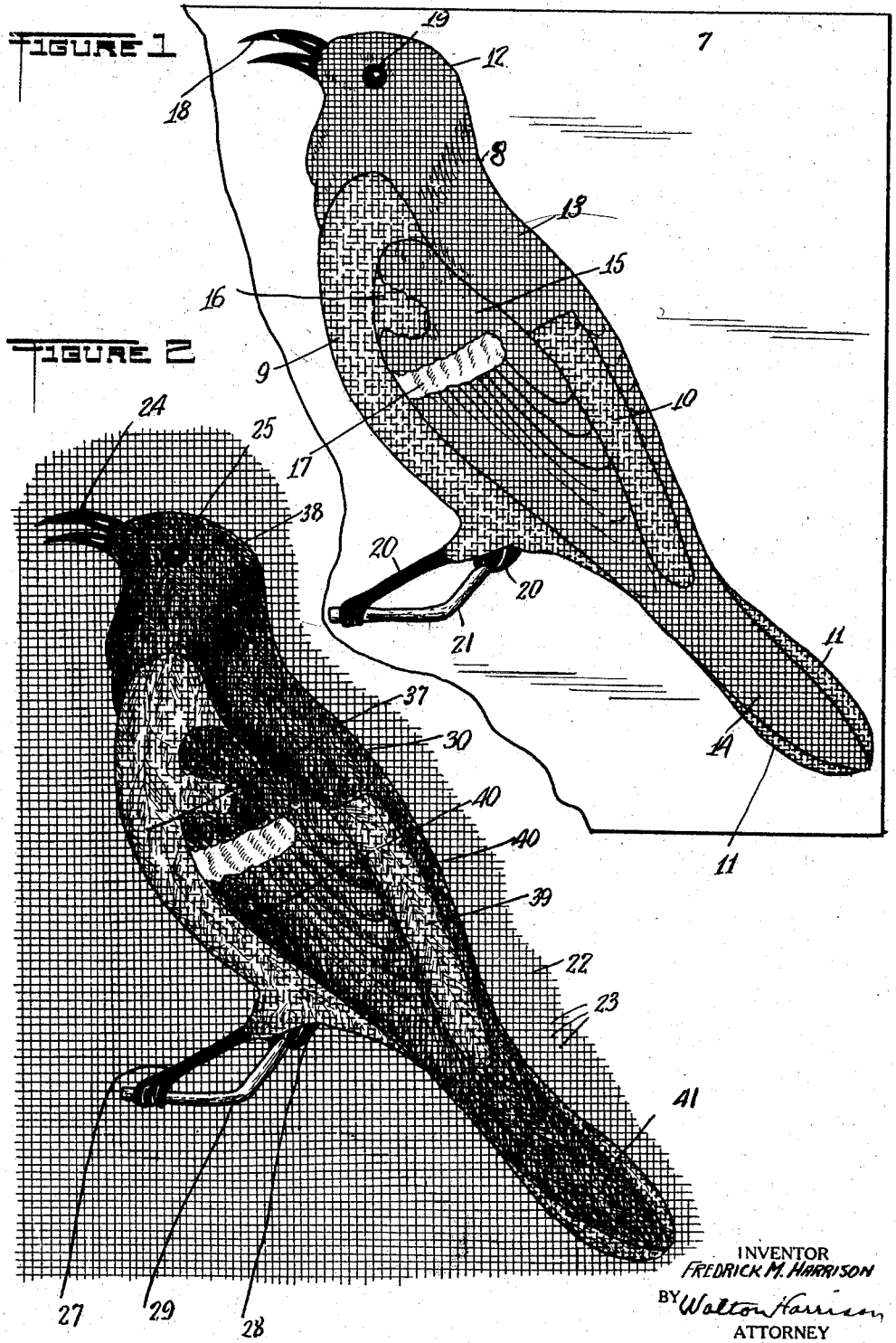

1,746,588

UNITED STATES PATENT OFFICE

FREDRICK MICHAEL HARRISON, OF FAR ROCKAWAY, NEW YORK

METHOD AND OUTFIT FOR FEATHER WEAVING

Application filed March 11, 1929. Serial No. 346,066.

My invention relates to a method and an outfit associated with such method, for feather weaving; that is, for enabling students or other persons to weave feathers, preferably selected as to size and color, so as to simulate or represent, mostly in feathers a predetermined picture or device.

More particularly stated, I seek to provide for enabling school children to so weave colored feathers upon a sheet of netting or similar foraminous material as to simulate a bird or the like, the feathers thus woven into the sheet preferably representing the feathers of a natural bird.

Reference is made to the accompanying drawings forming a part of this specification, and in which like reference characters indicate like parts throughout all of the figures.

Figure 1 is a plan view of a copy sheet, displaying a picture of a bird or the like, to be copied.

Figure 2 is a fragmentary view of the finished sheet; that is, after the feathers are woven.

Figure 3 is a fragmentary view of the work sheet, which is to be developed by the weaving of the feathers and the attachment of other parts, into the finished sheet.

Figure 4 is an enlarged fragmentary section of the work sheet, indicating the manner in which the feathers are to be woven.

Figure 5 is a plan view of a bit of colored sheet material formed to simulate the beak of a bird, and adapted to be secured to the work sheet.

Figure 6 is a plan view of a bead made to simulate the eye of a bird, and provided with a supporting stem 26 for supporting the bead upon the work sheet.

A copy sheet is shown at 7, and is usually a sheet of paper, carrying a picture 8 of an article to be copied, in this instance the representation of a bird.

The breast of the bird is shown at 9, and is colored yellow, to simulate soft feathers of that color, as they appear upon a bird. Similarly, the lower back portion 10 of the bird is yellow, in imitation of a surface made up of soft yellow feathers.

At 11, 11 are yellow portions, made in imitation of marginal tail feathers, rather large and stiff.

The head portion 12 and upper back portion 13 are colored black, in imitation of a surface of soft black feathers. The part 14 is colored and otherwise arranged to imitate the main tail feathers of the bird, which are rather large and stiff.

The wing portion 15 is mainly colored black, but is provided with a yellow spot 16 and a white spot 17, all in imitation of a wing having these colors.

The representation of the bird's beak appears at 18, the eye at 19, the feet at 20, 20, and a perch at 21.

The work sheet, upon which the feather weaving is to be done, is shown in Figure 3 at 22, and is made of material which is foraminous. In this particular instance the sheet is made of netting, and provided with meshes 23. Fabric mosquito netting or other light webbing may be used for the purpose.

The work sheet is provided with outlines 24, which delineate the form of the bird, and indicate the relative positioning of the various parts thereof.

A bit of sheet material 24, shown more particularly in Figure 5, is suitably formed and colored to imitate the beak of the bird. This member may be secured to the work by means of an adhesive, and is placed in the position indicated for it by the outlines with which the work sheet is provided.

A bead 25, shown more particularly in Figure 6, is made of glass or other appropriate material, of such form and coloring as to represent the bird's eye. This bead is provided with a metallic stem 26, formed like a pin, and adapted to be thrust back and forth through the work sheet and thus woven thereinto, so as to support the bead in position.

In order to imitate the feet of the bird, and a perch engaged by the feet, I provide the portions 27, 28, 29, which may be a single piece of sheet material, properly formed and colored to imitate the feet of the bird grasping the perch.

For the purpose of forming the body portion of the bird, feathers of different sizes and degrees of softness, and of different colors, are woven into the work sheet 2, as occasion may require. At 30 is shown a black soft feather, at 31 a pair of tail feathers, colored black and rather stiff, and at 32 is shown a soft feather having a yellow color. At 33 appears a wing feather, rather stiff and having a black color. At 34 and 35 are areas upon which are to be displayed feathers in bright colors, in this instance yellow and white.

The manner in which the feathers are woven into the work sheet may be understood from Figure 4. That is, the quill of the feather is used somewhat after the manner of a needle, and is thrust alternately back and forth through the netting. This gives the feather a good anchorage, and holds it firmly in position while allowing it to rest flatly against the work sheet.

The feathers as woven into the work sheet are to be arranged so as to conceal as far as practicable the quills and other unsightly portions, and yet to display to advantage the colorings and markings of the feathers.

It is particularly desirable that in weaving the feathers most parts of a mechanical nature may as far as practicable be hidden from view; and where shown at all, may harmonize with the feathers as regards coloring and position.

In the finished sheet as illustrated in Figure 2 the bird, though made up practically in its entirety of feathers, is made to imitate the bird shown in the copy sheet 7, in Figure 1.

In the bird as shown in Figure 2, the breast 37 is made up of soft yellow feathers; the head 38 of soft black feathers and the lower back 39, of soft yellow feathers. The wings 40, 40 are made up of feathers some white, some black and some yellow, these feathers being chosen, as to size and physical appearance, to render them appropriate for their respective parts.

The bird's tail 41 is made up of rather large and stiff feathers, some yellow and some black, properly arranged and displayed to imitate the appearance of the bird's tail.

As to colorings for the feathers, natural feathers can be used in instances where their colorings are of the kind required for the particular work in hand. However, for most practical purposes it is desirable that the feathers be colored, by staining or dyeing, in the manner well known in this art. Ordinarily the feathers are grouped into bunches, the feathers of each bunch all being substantially alike as to size and color. However, if desired the various feathers, previously colored may be mixed together indiscriminately. This affords a practical advantage, in that each student may be required to select and pick out feathers of different kind as required for different portions of the work. As a general rule it is desirable that the feathers of the various kinds and different colors be assorted, in order to reduce the time and labor required of the student.

I do not limit myself to the precise construction here illustrated and described, as variations may be made therein without departing from my invention, the scope of which is commensurate with my claims.

Having thus described my invention what I claim as new and desire to secure by Letters Patent is as follows:

1. The method herein described of feather weaving, which consists in securing to a foraminous work sheet a number of feathers having different colors and having quills of suitable size to be thrust through said foraminous work sheet, by thrusting a portion of each of said members back and forth through said work sheet, thus securing said members in relative position in accordance with a predetermined design.

2. The method herein described of feather weaving, which consists in weaving upon a foraminous work sheet a number of feathers, by thrusting the quills of the feathers back and forth through said work sheet, said feathers being so arranged, as to color and kind, as to imitate a predetermined design.

3. The method herein described of feather weaving, which consists in weaving upon a work sheet of netting a number of separate feathers, by thrusting the quills of said feathers through the meshes of said netting, the relative arrangement of said feathers as to color and kind being such as to indicate a predetermined design.

4. The method herein described of feather weaving, which consists in weaving upon a work sheet of netting a number of feathers differing in character and in color, the distribution of said feathers being such as to imitate a predetermined design, said feathers being woven into said netting and supported thereby.

5. An outfit for feather weaving, comprising a work sheet of foraminous material, and a plurality of feathers of different colors to be mounted upon said work sheet, said feathers having quills of suitable size to be thrust back and forth through portions of said work sheet and thus to be supported thereon.

6. An outfit for feather weaving, comprising a work sheet made of foraminous material and provided with an outline for a design to be copied, and a plurality of display members to be mounted upon said work sheet and positioned with reference to said outline, said display members being of different colors, and each having a portion of suitable form and size to be woven into said work sheet.

7. An outfit for feather weaving, comprising a work sheet made of netting and thus provided with meshes, and a plurality of feathers stained in colors, the color of one feather differing from the color of another, each feather having a quill of suitable size to be thrust through and woven into said work sheet.

8. An outfit for feather weaving, comprising a work sheet made of netting and thus provided with meshes, said work sheet being further provided with the outlines of a design to be copied, and a plurality of feathers differing substantially in color, each feather having a quill of proper form and size to be thrust back and forth through said meshes of said sheet of netting.

9. As an article of manufacture a work sheet made of netting and thus provided with meshes, said work sheet being further provided with the outlines of a design to be copied, and a plurality of feathers each having a quill thrust back and forth through said meshes in order to hold the feather in position, said feathers being so located relatively to said outline as to imitate said design.

10. In an outfit for feather weaving the combination of a work sheet made of netting and provided with an outline of a design to be copied, a plurality of feathers provided with quills to be woven into the netting to support the feathers in position to imitate a portion of said design, and a display member coacting with said feathers in order to imitate another portion of the design, said display member being provided with means for affixing it to said netting.

Signed at New York, in the county of New York and State of New York, this 9th day of March, 1929.

FREDRICK MICHAEL HARRISON.